(12) United States Patent
Hilgendorf

(10) Patent No.: US 9,120,630 B1
(45) Date of Patent: Sep. 1, 2015

(54) PALLET STACKER CONVEYOR

(71) Applicant: Dennis J. Hilgendorf, Stoughton, WI (US)

(72) Inventor: Dennis J. Hilgendorf, Stoughton, WI (US)

( * ) Notice: Subject to any disclaimer, the term of this patent is extended or adjusted under 35 U.S.C. 154(b) by 5 days.

(21) Appl. No.: 14/292,899

(22) Filed: May 31, 2014

(51) Int. Cl.
*B65H 15/00* (2006.01)
*B65G 25/04* (2006.01)
*B65G 57/08* (2006.01)
*B65G 65/23* (2006.01)

(52) U.S. Cl.
CPC .............. *B65G 25/04* (2013.01); *B65G 57/08* (2013.01); *B65G 65/23* (2013.01)

(58) Field of Classification Search
CPC ........ B65G 57/00; B65G 57/08; B65G 57/03; B65G 65/23; B65G 1/00; B65G 25/04
USPC ............. 414/789.3, 789.9, 790.6, 792.7, 799, 414/929, 276, 283, 284, 286, 331.13, 419, 414/425; 198/370.05, 613; 193/35 A, 45, 47
See application file for complete search history.

(56) References Cited

U.S. PATENT DOCUMENTS

| | | | |
|---|---|---|---|
| 3,998,169 A | 12/1976 | Koch | |
| 4,077,106 A | 3/1978 | Lichtenstein et al. | |
| 4,492,016 A | 1/1985 | Smets et al. | |
| 4,595,330 A * | 6/1986 | O'Brien et al. | 414/276 |
| 5,249,352 A | 10/1993 | Landers | |
| 5,355,575 A | 10/1994 | Self | |
| 5,617,961 A * | 4/1997 | Konstant et al. | 211/151 |
| 6,050,771 A * | 4/2000 | Dykstra | 414/795.8 |
| 6,079,939 A | 6/2000 | Smets | |
| 6,422,806 B1 | 7/2002 | Jenkins et al. | |
| 6,817,828 B2 | 11/2004 | Worrel et al. | |
| 7,052,228 B2 * | 5/2006 | de Jong | 414/789.2 |
| 7,150,598 B2 | 12/2006 | Smets et al. | |
| 7,650,690 B2 | 1/2010 | Trembley | |
| 7,717,665 B2 | 5/2010 | Jenkins | |
| 2002/0085902 A1 * | 7/2002 | Worrel et al. | 414/276 |
| 2003/0210978 A1 * | 11/2003 | Smets et al. | 414/798.9 |
| 2007/0065268 A1 * | 3/2007 | Clapp | 414/773 |

FOREIGN PATENT DOCUMENTS

DE    102009043490 A1    4/2011

* cited by examiner

*Primary Examiner* — Saul Rodriguez
*Assistant Examiner* — Lynn Schwenning
(74) *Attorney, Agent, or Firm* — Stiennnon & Stiennon

(57) ABSTRACT

A carriage has a pivot frame which receives individual pallets. When full, a latch is released and the frame is pivoted on a base by springs into a position parallel to inclined roller tracks. An operator pushes the carriage along the tracks to an unload station, where a stack of pallets is engaged by ramps leading to elevated roller tracks. Forward movement discharges the stack to the elevated tracks, and the carriage is drawn back to the starting position, where a latch is released to allow the pivot frame to return to its original orientation against the resistance of an air cylinder. A foot latch retains the carriage within the unload station during loading.

20 Claims, 7 Drawing Sheets

PALLET STACKER CONVEYOR

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to conveyors in general, and more particularly to apparatus for accumulating and transporting empty pallets for engagement by a lift apparatus.

A distribution center receives quantity loads of product, breaks those loads down into smaller aggregations, and distributes the products to a retailer or consumer. Often the bulk product is shipped and stored on a unit-sized pallet. Such pallets are received in racking systems which may extend several stories vertically above the ground floor. Goods on pallets are loaded by lift trucks into rack supply lanes where they advance to a picking face where operators select the quantities required for each destination. When the contents of a particular pallet are exhausted, the operator must extract the empty pallet from the supply lane, move it to a neighboring return lane, and arrange the pallet with other empty pallets in a stack assembled at the exterior face of the rack system where it can be accessed and removed by a lift truck.

A standard wooden pallet (48"×40"×6") may weigh 33 to 48 lbs. The continual lifting and stacking of these pallets places a burden on the distribution center workers which would desirably be alleviated. Moreover, because distribution center rack systems often extend multiple stories above the ground floor over which the lift trucks move, it is desirable that workers not be required to approach too closely to a sheer drop. Another consideration is that in the vast expanse of many distribution centers it is desirable to keep construction and operation costs to a minimum. Although various robotic, pneumatic, or hydraulic conveyors are known, a pallet conveyor system which did not require any power source would eliminate not only construction and equipment costs, but would reduce the maintenance and operation costs of the facility.

SUMMARY OF THE INVENTION

The pallet conveyor of the present invention provides a manually operated and ergonomic apparatus for moving individual pallets from the picking face of a rack system within a distribution center to a stack ready for removal at the exterior face of the rack system by a life truck. A carriage has a base which is mounted to two downwardly inclined roller tracks for movement in a machine direction from a load station, where individual pallets are entered into the carriage, and an unload station, where a stack of pallets is presented on a horizontal surface for removal by a lift truck's tines. The carriage has a pivot frame mounted to the base to pivot about a cross-machine direction axis. The pivot frame has two side members which connect an inlet member to two inwardly extending pallet flanges 90 degrees away. A handle protrudes from the inlet member and has an inlet edge. Each pallet is slid over the inlet member to fall into the pivot frame along the inlet member. It may then be pivoted to lie parallel to the pallet flanges. Repeating this process, the pivot frame is filled with an array of on-edge pallets. Once full, a latch is released allowing a spring to rotate the pivot frame so that the pallet flanges and the overlying pallets extend parallel to the base. An operator needs to release a foot pedal (or other release mechanism) to allow the operator to move the stack of pallets along the track. A second latch is engaged to retain the pivot frame in this orientation while the operator pushes the carriage along the roller tracks until two inlet ramps at the unload station engage the pallet stack as the forward motion of the carriage drives the stack up onto the unload roller tracks. The pallet load being thus removed from the carriage, the operator then withdraws the carriage and walks it back to the load station, where the second latch is released and the pivot frame is returned to its original condition by the operator pressing down on the handle against the resistance of an air cylinder. A foot latch retains the carriage within the unload station during loading.

It is an object of the present invention to provide a manually operated conveyor which allows a single operator to stack and transport a number of pallets with minimal lifting.

It is a further object of the present invention to provide an apparatus to assist an operator in stacking and transporting pallets from one face to another of a rack system.

Further objects, features and advantages of the invention will be apparent from the following detailed description when taken in conjunction with the accompanying drawings.

DESCRIPTION OF THE PREFERRED EMBODIMENTS

Figure 1:
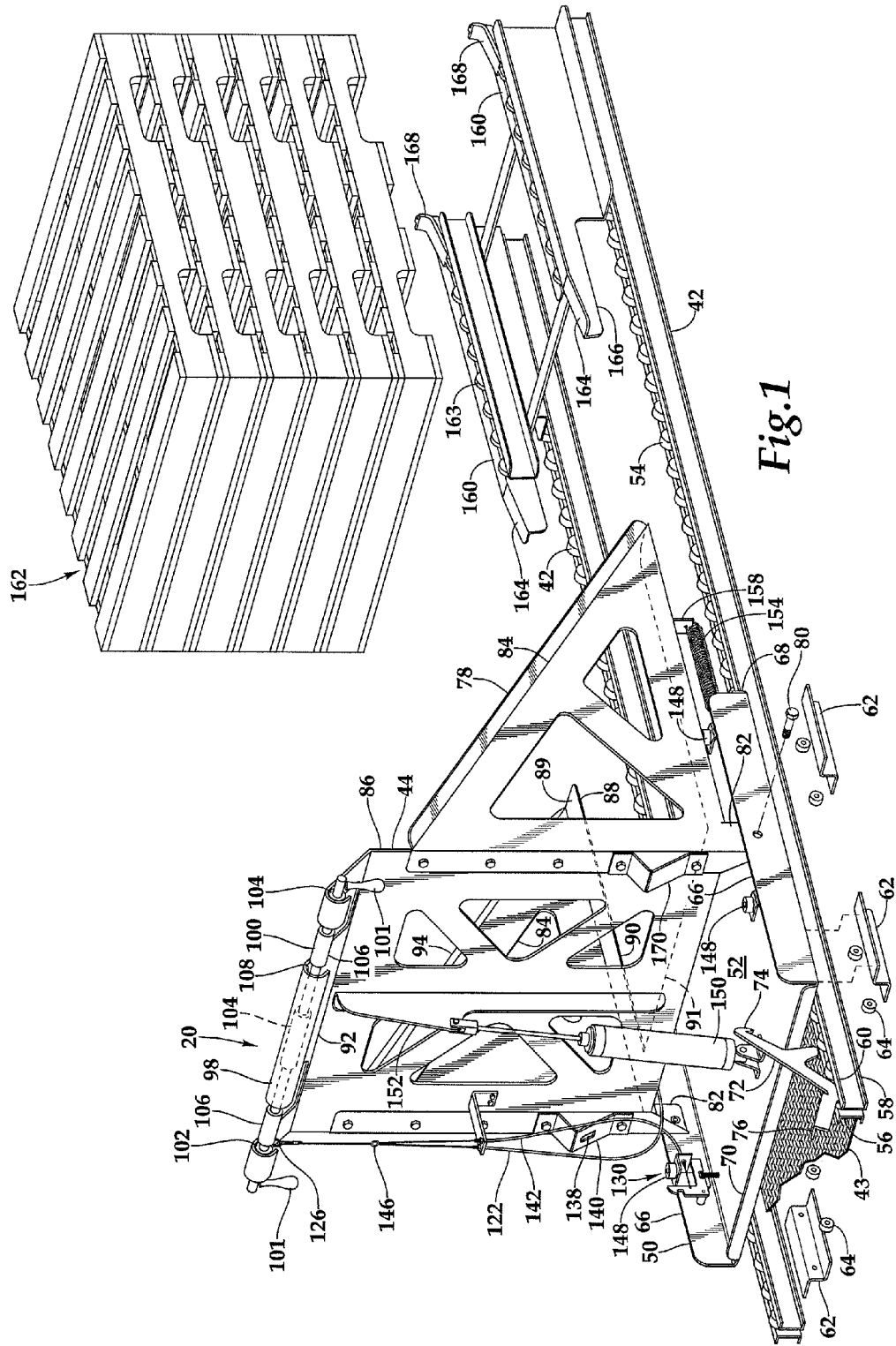
FIG. 1 is an exploded isometric view of the pallet conveyor of the present invention.
Figure 2:
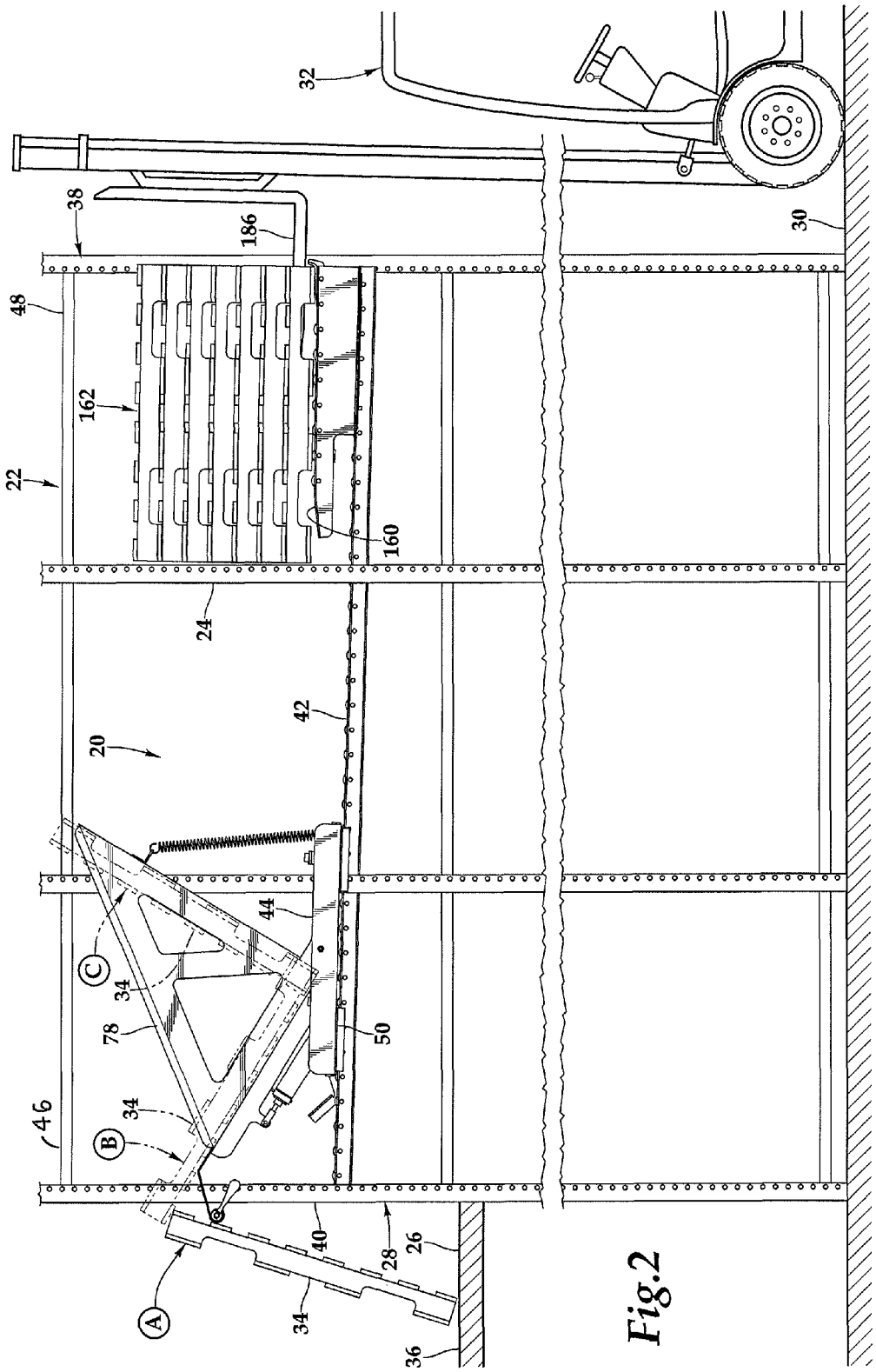
FIG. 2 is a side elevational view of the pallet conveyor of FIG. 1 showing pallets being loaded at a load station, and a stack of pallets being removed by a lift truck at an unload station.

Referring more particularly to FIGS. 1-8, wherein like numbers refer to similar parts, a manual pallet conveyor 20 of this invention is shown in FIG. 1. As shown in FIG. 2, the conveyor 20 is mounted within a conventional rack 22 such as is commonly used in a product distribution center. The rack 22 has vertical members 24 which extend upwardly above a floor 26 where operators move along an aisle 36 adjacent the rack extracting products from a pick face 28. The rack 22 will typically have multiple vertical levels spaced above a main floor 30 where lift trucks 32, as shown in FIG. 2, move between the rack 22 and other locations, bringing pallets 34 to the loading face 38 of the rack. The pallets 34 carrying product to be distributed are inserted into the racks 22 on roller tracks (not shown) which are inclined from the loading face 38 to the pick face 28. When the product on a pallet has been depleted, the operator extracts the empty pallet 34 from a rack bay containing product, and brings it to a return bay 40 for assembly into a vertical stack of pallets and removal from the rack. Each return bay 40 is outfitted with a conveyor 20. The proportion of return bays 40 to product bays will depend on the dynamics of the particular distribution center, but the product bays will outnumber the return bays.

As shown in FIG. 2, the conveyor 20 has two parallel roller tracks 42 which are mounted to the rack 22 within a return bay 40. The tracks 42 are preferably inclined from the pick face 34 to the loading face 38 at an angle of about 1-5 degrees with respect to the horizontal. The tracks 42 may be mounted to the rack above the level of the aisle floor 26, for example 16-26 inches, to facilitate convenient loading of empty pallets into the conveyor 20. Tread plates 43 are positioned between the roller tracks 42 to enable an operator to walk along the return bay 40.

As shown in FIG. 1, the conveyor has a carriage 44 which moves in a machine direction along the tracks 42 from a load station 46 opening on the pick face of the rack to an unload station 48 at the load face of the rack. The carriage 44 has a base 50 with a planar lower wall 52 which rides on the rotatable rollers 54 of the roller tracks 42. As shown in FIG. 1, the rollers 54 of the roller tracks 42 are mounted between an inside C-channel 56 and an outside C-channel 58. The outside C-channel 58 has an outwardly projecting flange 60. Two follower brackets 62 are mounted beneath the carriage base 50 lower wall 52 on each side of the carriage. The follower brackets 62 extend beneath the outwardly projecting flanges 60 of the roller tracks 42 and retain the carriage 44 on the tracks. The follower brackets 62 may have plastic bumpers 64 to position the carriage in the cross machine direction with respect to the roller tracks 42.

The base lower wall 52 has two upwardly extending side members 66 which extend in the machine direction, and a front member 68 which extends upwardly in the front of the base 50 and a rear member 70 which extends upwardly at the rear of the base. A foot release latch 72, shown in FIGS. 1 and 2, is pivotally mounted to one of the roller tracks 42 upstream of the carriage. The foot release latch 72 is pinned to the track 42 and has a projection 74 which extends frontwardly to engage the rear member 70 of the base 50 and thereby restrain the carriage from moving in the machine direction towards the unload station. The foot release latch 72 has a sidewardly projecting foot pedal 76, which, when trod upon by an operator, releases the carriage so that it may be advanced towards the unload station.

A pivot frame 78 is mounted to the base 50 of the carriage 44 about a pivot axis which extends in the cross machine direction through two bolts 80 which extend through two mounting arms 82 extending downwardly from the pivot frame. The bolts 80 extend through the base side members 66. The pivot frame 78 is comprised of two generally triangular side members 84 which are joined by a rear member 86 which spaces the side members in the cross machine direction and parallel to one another a sufficient width to receive a plurality of pallets between the side members. Each side member has a pallet support flange 88 extending in the machine direction and in the cross machine direction. Each pallet support flange 88 has an upper surface 89 which is positioned to engage the lowermost pallet in a stack of pallets to be transported. The pallet support flanges are connected by an entry lip 91 which extends in the cross machine direction and extends frontwardly from the rear member 86. A first gap 90 is defined between the pallet support flanges 88. The gap 90 opens downwardly and towards the unload station. The rear member 86 has an interior surface 87 which is approximately perpendicular to the upper surfaces of the pallet support flanges 88, thus a 90 degree angle is defined between the rear member 86 and the pallet support flanges 88.

The mounting arms 82 may be formed as parts of the side members so as to extend downwardly from the triangular side members. Although the pivot frame may be formed as a weldment, it may be assembled with fasteners from sheet metal parts, allowing the pivot frame to be knocked down for compact shipping prior to installation.

Figure 7:
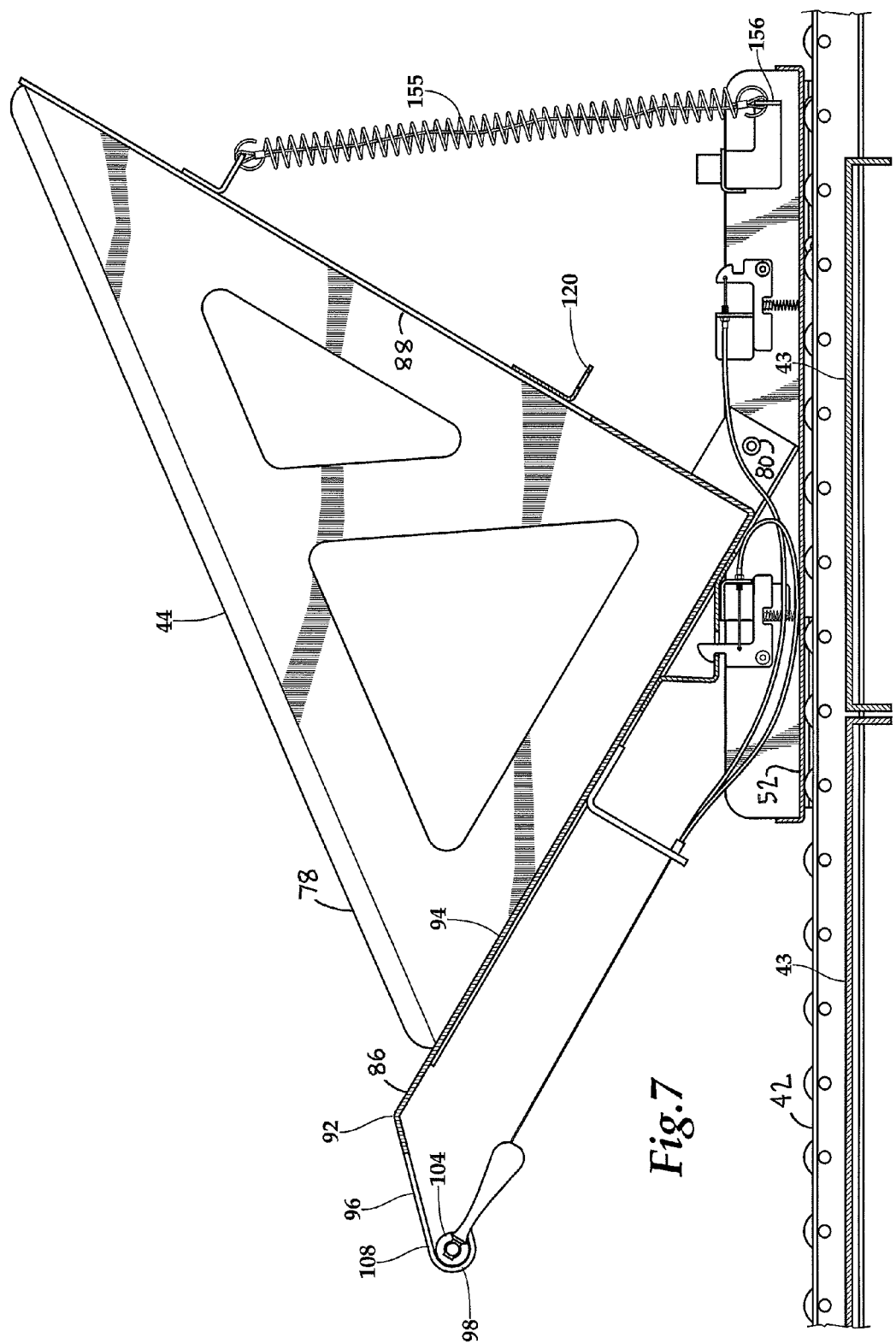
FIG. 7 is a side cross-sectional view of the device of FIG. 2, shown in the load position, and shown untilted for clarity.
Figure 8:
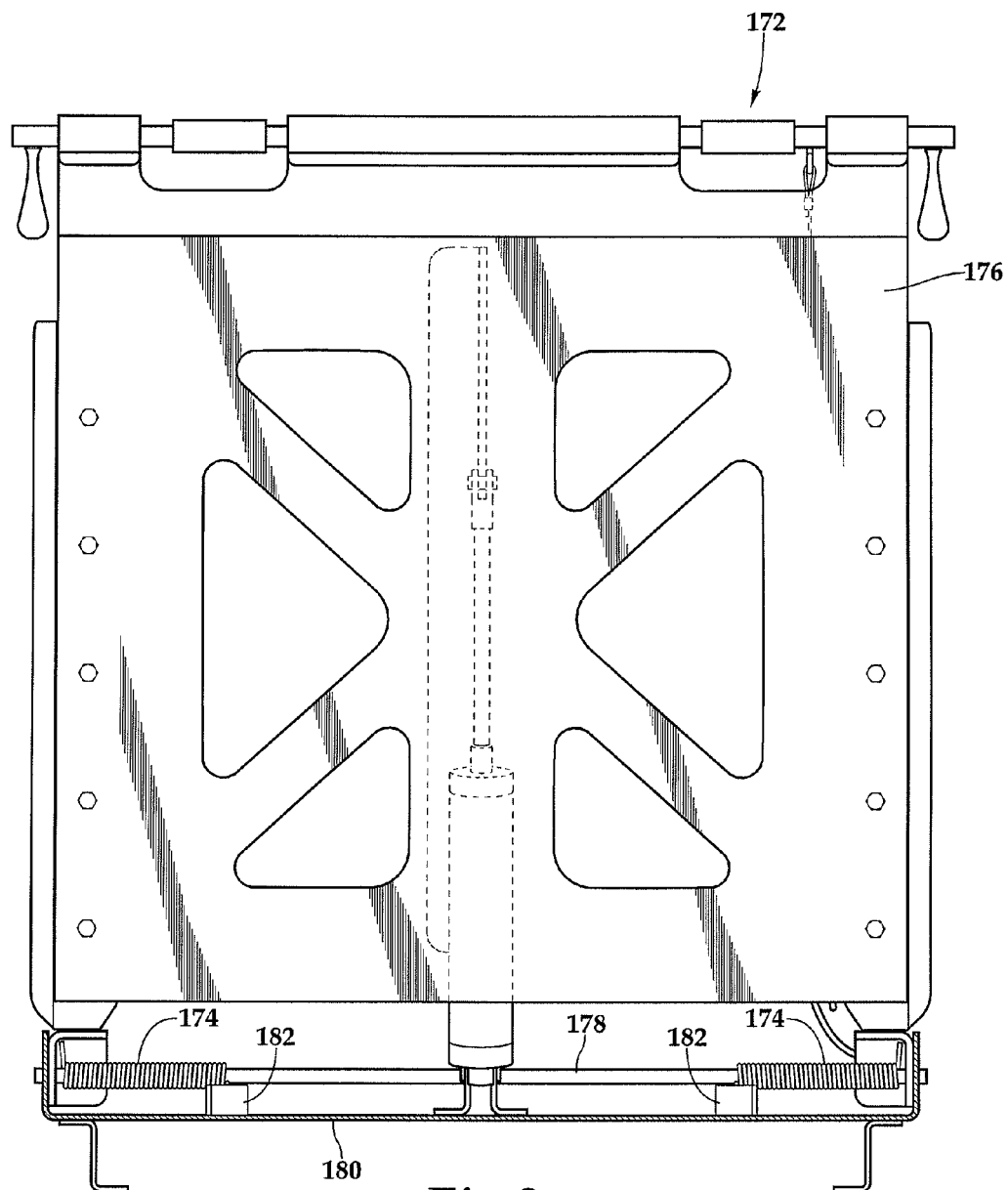
FIG. 8 is front elevational view of the carriage of an alternative embodiment pallet conveyor of this invention employing torsion springs.

As best shown in FIG. 7, the rear member 86 has an upper inlet edge 92. The pivot frame 78 defines an interior 94 which can receive pallets therein. The pivot frame 78 is pivotable on the bolts 80 between a first position where the rear member 86 is tilted towards the load station and the pallet flanges extend generally upwardly, and a second position in which the rear member 86 is generally perpendicular to the roller tracks 42 and the pallet flanges are parallel or approximately parallel to the roller tracks. In the first position, the rear member interior surface 87 is disposed at an angle of from 20 to 45 degrees with respect to the plane of the base lower wall 52, and is preferably about 30 degrees.

A ledge 96 projects rearwardly of the rear member 86, and extends from the rear member upper edge 92 at an angle greater than 180 degrees from the interior surface 87 of the rear member 86. This angle may be between 215 to 240 degrees, measured from the surface 87. The ledge 96 may be formed from the same sheet metal element as the rear member 86. The ledge 96 is terminated by semicylindrical housing 98 which receives a rotatable handle 100, shown in FIG. 1.

The handle 100 comprises a shaft 102 which extends in the cross machine direction and which is supported by three cylindrical bearings 104 which are fixed to the housing 98, one in the center of the housing and one at each end of the housing. The ends of the handle 100 are provided with handle extensions 101 which project radially outwardly to assist in rotating the handle within the bearings 104. The handle 100 may be provided with two resilient handgrips 106, for example formed of rubber or polyurethane, which are accessible through clearance openings 108 in the housing 98. Thus an operator may engage the carriage with both hands on the handle 100 for applying force to the carriage 44 to move it towards or away from the unload station 48. The housing 98 projects beyond the handle 100 such that a pallet may be loaded across the housing, as shown in FIG. 2, without interfering with the handle.

The handle 100 provides the points of engagement between the operator and the carriage so that the operator may carry out all multiple operations necessary to control the conveyor 20. In addition to providing a position for applying force to move the carriage in the machine direction, the handle 100 is also connected by cable linkages to two latches which selectively retain the pivot frame 78 in the first position for loading, or the second position for transport.

Figure 5:
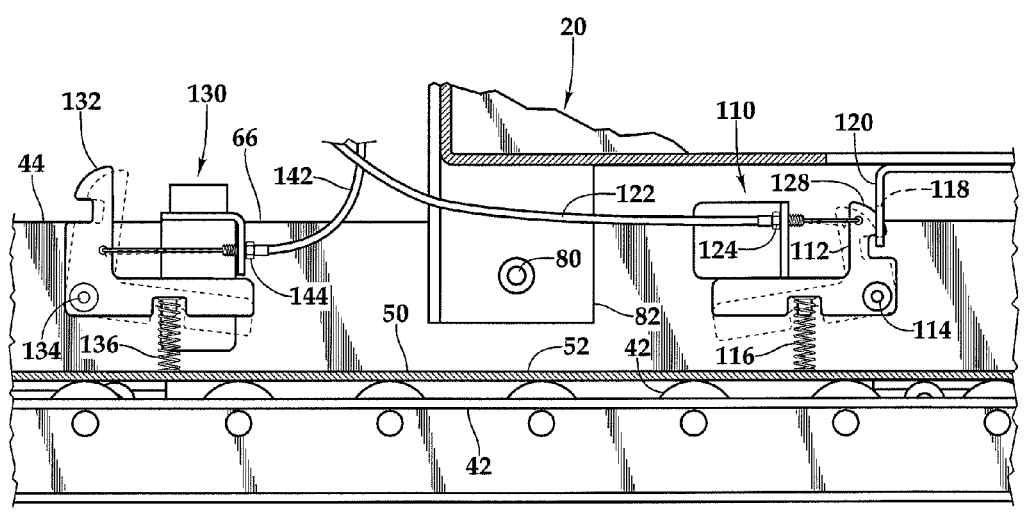
FIG. 5 is a fragmentary cross-sectional view of the pallet conveyor carriage of FIG. 4 showing the cable actuation mechanism of the rear and front latches.

As shown in FIG. 5, the front latch assembly 110 releasably retains the pivot frame in the second position for transport. The front latch assembly 110 has a latch member 112 which is pivotably mounted about a pivot axle 114 to one of the base side members 66. A restoring spring 116 extends between the latch member and the base lower wall 52, and urges the latch member 112 into engagement with a slot 118 formed in a bracket 120 which projects downwardly from an overlying pallet support flange 88. An actuation cable 122 extends from the latch member 112 through a cable fitting 124 fixed to the base side member 66 and from there to an eyelet 126 which extends from the handle shaft 102 through one of the clearance openings 108 in the handle housing. As shown in FIG. 5, the latch member 112 has an inclined upper cam surface 128 such that when the pivot frame is urged frontwardly into the second position, the latch member will be driven into engagement with the slot 118 in the bracket 120, and the pivot frame will thereby be retained in the second position. When it is desired to release the front latch assembly 110, the handle shaft 102 is rotated by the operator, thus retracting the latch member 112 and freeing the pivot frame from engagement with the latch.

A rear latch assembly 130, shown in FIG. 5, has a similar construction, with a latch member 132 which is pivotably mounted about a pivot axle 134 to one of the base side members 66. A restoring spring 136 extends between the latch member and the base lower wall 52, and urges the latch member 132 into engagement with a slot 138 formed in a bracket 140 which projects from the pivot frame rear member 70, as shown in FIG. 1. An actuation cable 142 extends from the latch member 132 through a cable fitting 144 fixed to the base side member 66 and from there to the eyelet 126 which extends from the handle shaft 102 through one of the clearance openings 108 in the handle housing. Separate cables may be used for each latch assembly, or, as shown, the two cables may be joined at a splitter 146 to a single cable which connects to the eyelet 126. Hence rotation of the handle causes both the front latch assembly and the rear latch assembly to be simultaneously operated.

Figure 4:
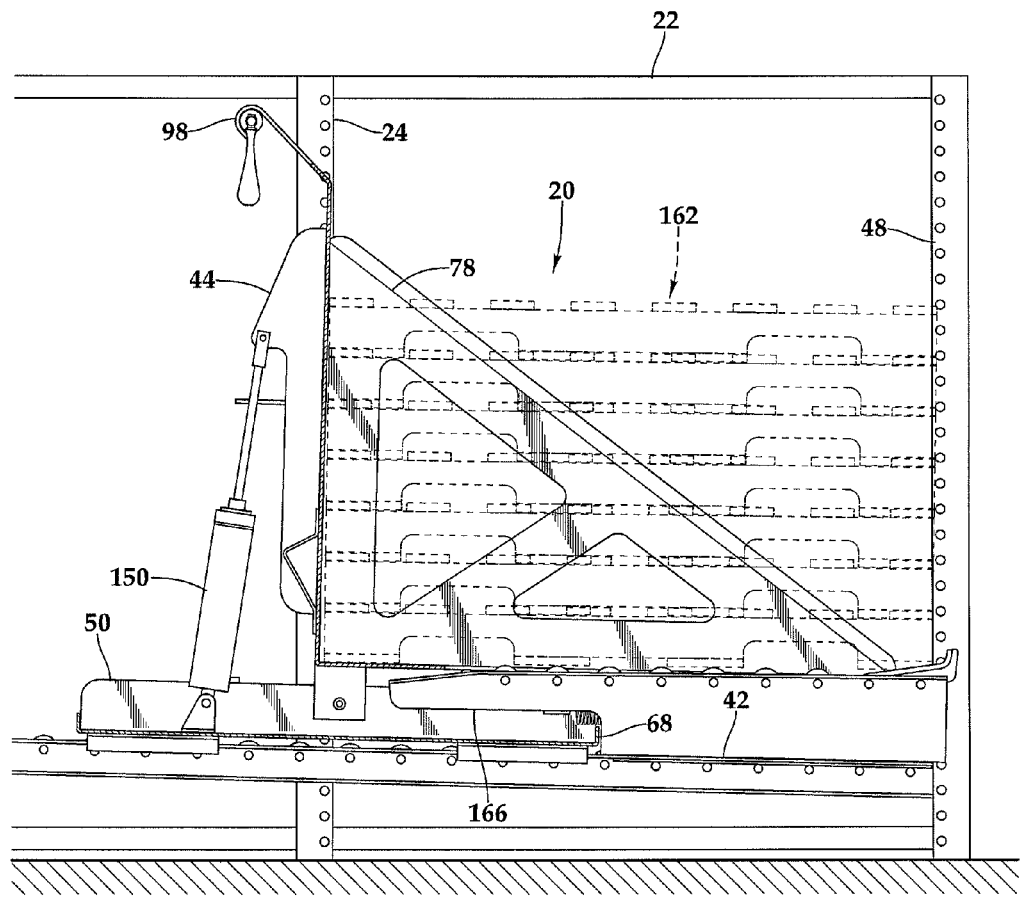
FIG. 4 is a side elevational view of the pallet conveyor of FIG. 3 as the pallets are offloaded from the carriage at the unload station.
Figure 6:
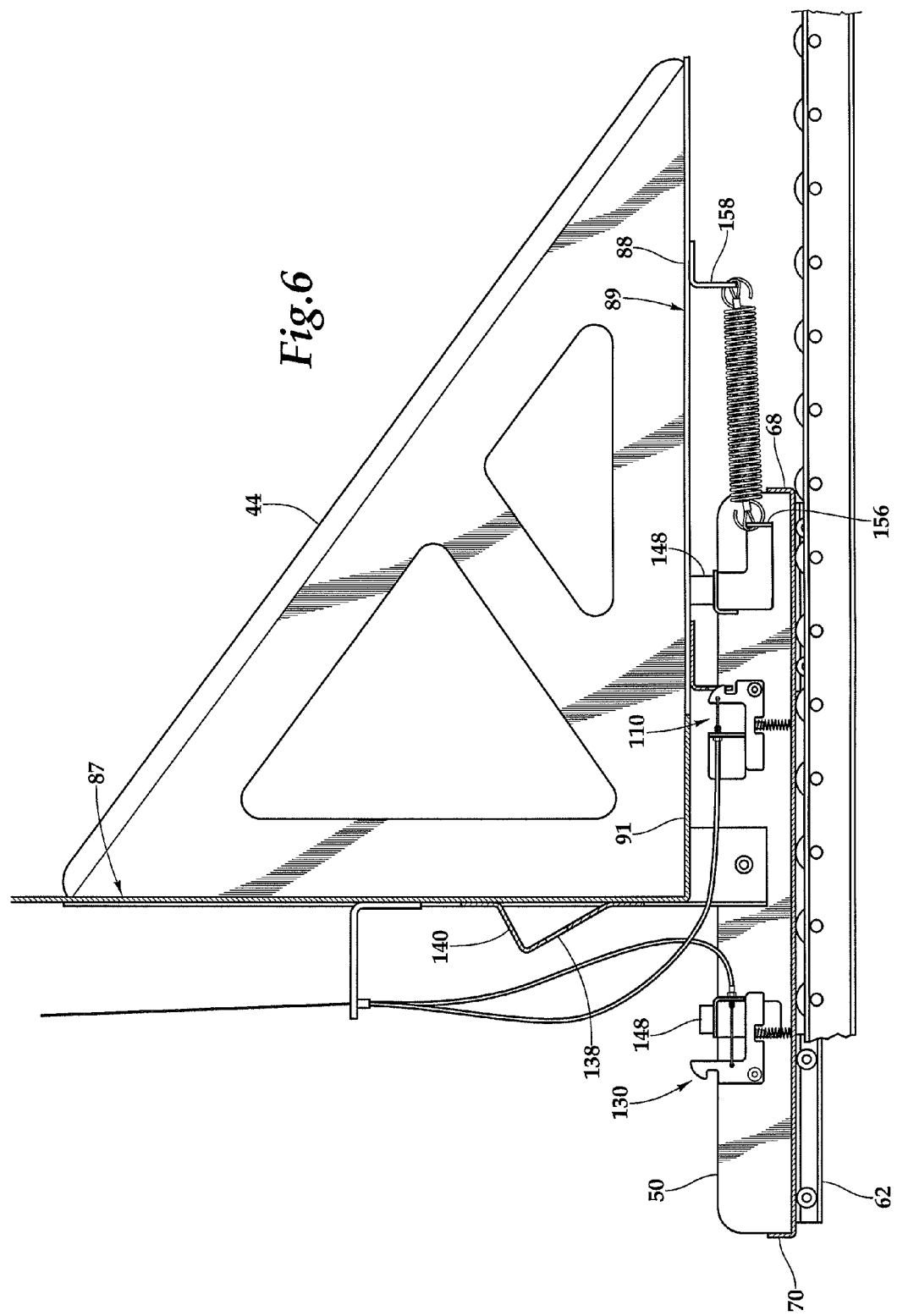
FIG. 6 is a side cross-sectional view of the carriage and track of the device of FIG. 4, shown untilted for clarity.

As shown in FIG. 6, four resilient bumpers 148 are mounted to the base 50 to absorb the impact when the pivot frame is latched into the first or the second position. As shown in FIG. 4, to further reduce the impact of the change in position of the pivot frame and to serve as a shock absorber an air cylinder 150 extends between the base 50 and a cylinder bracket 152 which projects rearwardly of the rear member 70 of the pivot frame.

As shown in FIGS. 1 and 2, the pivot frame 78 is biased to the second transport position by two extension springs 154. The springs 154 extend between spring brackets 156 fixed to the front of the base side members 66, and spring brackets 158 which extend downwardly from the pivot frame pallet support flanges 88. The springs 154 are preferably provided with axially extending cables 155 (shown in FIG. 7 only), which are secured to the pivot frame and the base. The cables 155 then retain portions of the springs should a spring break.

As shown in FIG. 2, the unload station comprises two horizontal segments of roller track which define receiving members 160 for supporting a stack 162 of pallets 34. The receiving members 160 have rollers which define an approximately horizontal pallet support surface 163 which is above the level of the pallet support flanges 88 of the pivot frame 78 when the carriage is fully engaged in the unload station as shown in FIG. 4. As shown in FIG. 1, the receiving members 160 are spaced inwardly of the tracks 42 in the cross-machine direction. They are spaced inwardly sufficiently that they do not interfere with the pallet support flanges 88. An inlet ramp 164 is mounted to the rear of each receiving member 160, the ramps extend from a position below the upper surfaces 89 of the pallet support flanges, to a position above the upper surfaces. As shown in FIG. 2, a clearance opening 166 is provided below each inlet ramp 164. The cut-out portions of the receiving members 160 allow the base 50 of the carriage to progress beneath the receiving members. Each receiving member 160 is terminated by a load stop member 168, shown in FIG. 1, which has a projection which engages with the lower edge of a pallet stack and retains the stack on the receiving members.

The conveyor 20 makes it possible for an operator to assemble a vertical stack of pallets without electrical, pneumatic, or hydraulic assistance, and without having to directly lift the individual pallets onto a vertical stack. With the carriage retained at the load station by engagement with the foot release latch 72, and the pivot frame retained in the first position for loading by the rear latch assembly 130, the operator brings an empty pallet 34 along the aisle 36 to the floor 26 at the foot of the load station 46. The operator may be able to drag or skid the pallet 34 to this position. The pallet 34 is then leaned up against the handle housing 98 in the position A indicated in FIG. 2. With a portion of the weight of the pallet supported on the handle housing 98, the operator slides the pallet upwardly until the pallet's center of mass passes over the ledge 96 at which point the weight of the pallet causes it to pivot and be supported on the ledge. After this point the operator need no longer lift the pallet, but is instead urging the pallet frontwardly in the machine direction. When the pallet's center of mass passes beyond the upper inlet edge 92 of the rear member of the pivot frame 78, the pallet will pivot again and descend into the pivot frame interior, until the pallet engages the entry lip 91 which is substantially coplanar with the pallet support flanges 88, as indicated by position B in FIG. 2. With the pallet extending along the interior surface 87 of the pivot frame rear member, the upper edge of the pallet extends above the handle housing where it is readily accessible to the operator who gives it a strong push to cause the pallet to pivot from lying along the interior surface of the rear member to lying along the oppositely inclined pallet support flanges 88, as indicated by the position C in FIG. 2. Subsequent pallets are introduced into the pivot frame interior in a similar manner, although these pallets in position B will engage against the underlying pallets of the stack rather than the pallet support flanges.

When enough pallets have been received within the carriage to form a stack of the desired height, the operator engages the handle 100 and rotates it to release the rear latch assembly 130. Once the rear latch member 132 disengages from the pivot frame 78 bracket 140, the extension springs 154 act to rotate the pivot frame about the bolts 80 into the second position where the pallets in the stack are substantially parallel to the lower wall 52 of the carriage base 50. The air cylinder 150 serves to slow the transition from the first position to the second position, reducing the impact on the pallets when the pivot frame swings into the second position.

Figure 3:
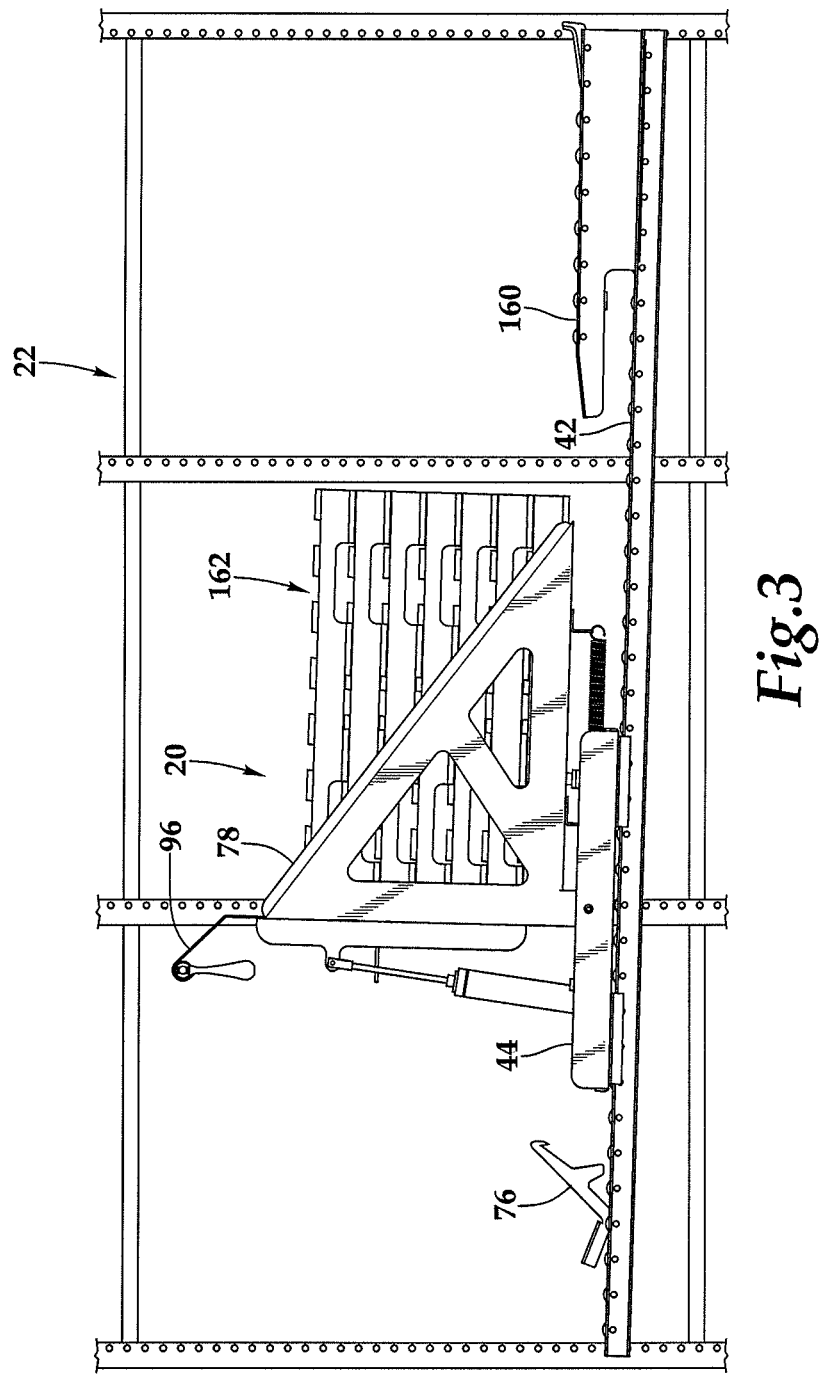
FIG. 3 is a side elevational view of the pallet conveyor of FIG. 2 as a load of pallets is being transferred to the unload station.

The operator then steps on the foot pedal 76 of the foot release latch 72, to disengage the projection 74 from the rear wall 70 of the carriage base 50. As the roller tracks 42 are inclined towards the unload station, the unrestrained carriage will tend towards the unload station. With the carriage unrestrained in the load station, the operator steps up on to the tread plates 43 within the return bay 40 and pushes on the handle to assist the loaded carriage along its path towards the unload station as shown in FIG. 3.

As the carriage 44 approaches the receiving members 160, the pallet stack engages the inlet ramps 164. The interior surface 87 of the rear member 86 bears on the pallet stack, and, as the operator pushes the carriage forward, the rear member engages the stack and urges it up on to the top surface of the receiving members 160 until the front edge of lowermost pallet of the stack encounters the load stop members 168. At which point the center of mass of the pallet stack is disposed over the receiving members 160 and the pallet stack is nearly entirely supported on the receiving members 160.

The carriage 44 is also prevented from advancing too far and driving the pallet stack beyond the receiving members 160 by engagement of the carriage base front member 68 against the edges of the pallet receiving members at the clearance openings 166 as shown in FIG. 4.

Once the pallet stack has been transferred to the receiving members 160 at the unload station 48, the operator withdraws the carriage 44 from beneath the receiving members by walking back the carriage toward the load station. During its return trip, the pivot frame may be retained in the latched second position.

The pallet stack 162, supported on the receiving members, is then readily engaged by the lift truck 32 tines 186, removed from the rack 22, and transported elsewhere.

When the carriage 44 is once again within the load station, the foot release latch 72 is again engaged with the base 50, holding the carriage in place in the machine direction. The operator then rotates the handle 100 to release the front latch assembly 110 and presses down on the handle to pivot the pivot frame until it latches with the rear latch assembly 130. Again, the air cylinder 150 cushions the shock of the pivot frame engaging the base. It will be observed that the bracket 140, with which the rear latch engages, controls the maximum angle at which the pivot frame 78 can be inclined. A similar unslotted bracket 170 is located on the opposite side of the pivot frame rear member. Once the pivot frame 78 is returned to the first position, it may be loaded again with additional pallets. The first stack 162 need not be immediately removed from the unload station 48, as the unload station does not need to be cleared until the carriage is filled with a new stack.

An alternative embodiment carriage 172 is shown in FIG. 6 which employs torsion springs 174 instead of extension springs to urge the pivot frame 176 into the second, transport, position. The torsion springs 174 may be mounted on a shaft 178, with each spring extending between a torsion spring block 182 connected to the carriage base 180, and the pivot frame 176.

It is understood that the invention is not limited to the particular construction and arrangement of parts herein illustrated and described, but embraces all such modified forms thereof as come within the scope of the following claims.

I claim:

1. A pallet conveyor for transporting a plurality of pallets from a load station to an unload station, the conveyor comprising:
    at least one track extending in a machine direction from a load station to an unload station;
    a carriage having a base which is mounted to the at least one track for movement from the load station to the unload station in the machine direction;
    a pivot frame mounted to the carriage base about a pivot axis which extends in a cross machine direction, the pivot frame having two side members spaced apart in the cross machine direction to receive the plurality of pallets therebetween, wherein the pivot frame has pallet support flanges extending in the machine direction, the flanges having portions which extend toward each other in the cross machine direction and having upwardly facing support surfaces lying in a first plane, and wherein a first gap is defined between the pallet support flanges in the first plane and opening towards the unload station, the received plurality of pallets bridging the first gap, and wherein the pivot frame has a rear member angled with respect to the pallet support flanges, the pivot frame being pivotable about the pivot axis between a first position where the pallet support flanges are tilted a first angle with respect to the carriage base, and a second position where the pallet support flanges are tilted a second angle with respect to the carriage base which is less than the first angle, wherein the pallet support flanges in the first plane are located spaced above the at least one track when the pivot frame is in the second position;
    a handle extending towards the load station from the pivot frame rear member, the handle having portions defining an inlet edge;
    at least one biasing member extending between the pivot frame and the carriage base to urge the pivot frame towards the second position; and
    at least one receiving member fixed at the unload station having portions located above the at least one track and extending towards the carriage, the at least one receiving member shaped to fit in the first gap between the pallet support flanges, the at least one receiving member having a top surface spaced above a portions of at least one pallet support flange upper support surface lying in the first plane, such that when the carriage is advanced so as to put the plurality of pallets above the at least one receiving member, the plurality of pallets supported on the pallet flanges ride up on and are supported by the at least one receiving member.

2. The conveyor of claim 1 further comprising a shock absorber extending from the pivot frame to the carriage base.

3. The conveyor of claim 1 wherein the at least one track is inclined towards the unload station.

4. The conveyor of claim 1 wherein the pallet support flanges comprise a U-shaped arrangement with two arms with a base extending between the two arms, and the first gap being defined between the two arms.

5. A pallet conveyor for transporting a plurality of pallets from a load station to an unload station, the conveyor comprising:
    at least one track extending in a machine direction from a load station to an unload station;
    a carriage having a base which is mounted to the at least one track for movement from the load station to the unload station in the machine direction;
    a pivot frame mounted to the carriage base about a pivot axis which extends in a cross machine direction, the pivot frame having two side members spaced apart in the cross machine direction to receive the plurality of pallets therebetween, wherein the pivot frame has pallet support flanges extending in the cross machine direction and having upwardly facing support surfaces, and wherein a first gap is defined between the pallet support flanges and opening towards the unload station, the received plurality of pallets bridging the first gap, and wherein the pivot frame has a rear member angled with respect to the pallet support flanges, the pivot frame being pivotable about the pivot axis between a first position where the pallet support flanges are tilted a first angle with respect to the carriage base, and a second position where the pallet support flanges are tilted a second angle with respect to the carriage base which is less than the first angle;
    a handle extending towards the load station from the pivot frame rear member, the handle having portions defining an inlet edge,
    at least one biasing member extending between the pivot frame and the carriage base to urge the pivot frame towards the second position;
    at least one receiving member fixed at the unload station and extending towards the carriage, the at least one receiving member shaped to fit in the first gap between the pallet support flanges, the at least one receiving member having a top surface spaced above a top surface of at least one pallet support flange upper support surface, such that when the carriage is advanced so as to put the plurality of pallets above the at least one receiving member, the plurality of pallets supported on the pallet flanges ride up on and are supported by the at least one receiving member; and wherein the at least one track is inclined towards the unload station, and wherein the at least one receiving member is elevated above the at least one track, and the at least one receiving member extends substantially horizontally.

6. The conveyor of claim 5 wherein the at least one receiving member further comprises an inlet ramp facing the carriage.

7. A pallet conveyor for transporting a plurality of pallets from a load station to an unload station, the conveyor comprising:
at least one track extending in a machine direction from a load station to an unload station;
a carriage having a base which is mounted to the at least one track for movement from the load station to the unload station in the machine direction;
a pivot frame mounted to the carriage base about a pivot axis which extends in a cross machine direction, the pivot frame having two side members spaced apart in the cross machine direction to receive the plurality of pallets therebetween, wherein the pivot frame has pallet support flanges extending in the cross machine direction and having upwardly facing support surfaces and wherein a first gap is defined between the pallet support flanges and opening towards the unload station, the received plurality of pallets bridging the first gap, and wherein the pivot frame has a rear member angled with respect to the pallet support flanges, the pivot frame being pivotable about the pivot axis between a first position where the pallet support flanges are tilted a first angle with respect to the carriage base, and a second position where the pallet support flanges are tilted a second angle with respect to the carriage base which is less than the first angle;
a handle extending towards the load station from the pivot frame rear member, the handle having portions defining an inlet edge;
at least one biasing member extending between the pivot frame and the carriage base to urge the pivot frame towards the second position;
at least one receiving member fixed at the unload station and extending towards the carriage, the at least one receiving member shaped to fit in the first gap between the pallet support flanges, the at least one receiving member having a top surface spaced above a top surface of at least one pallet support flange upper support surface, such that when the carriage is advanced so as to put the plurality of pallets above the at least one receiving member, the plurality of pallets supported on the pallet flanges ride up on and are supported by the at least one receiving member; and
wherein the rear member has portions defining a plane parallel to the cross-machine direction axis, and wherein the handle extends from the rear member in the machine direction away from the unload station such that the handle inlet edge is spaced out of the plane of the rear member and lower than an uppermost portion of the rear member when the carriage is in the first position.

8. A pallet conveyor for transporting a plurality of pallets from a load station to an unload station, the conveyor comprising:
at least one track extending in a machine direction from a load station to an unload station;
a carriage having a base which is mounted to the at least one track for movement from the load station to the unload station in the machine direction;
a pivot frame mounted to the carriage base to pivot about a pivot axis which extends in a cross machine direction, the pivot frame having a rear wall defining a rear surface with an upper edge, wherein portions of the pivot frame define pallet support flanges which define a pallet support plane which is angled away from the rear wall;
a ledge which extends rearwardly from the rear wall upper edge at an angle of greater than 180 degrees, the angle being measured between the ledge and the rear wall, the ledge having a rearward line of entry, such that a pallet is loadable into the pivot frame by engagement with the ledge, followed by rotation over the ledge into position against the rear surface and then pivoting to engage the pallet support flanges;
wherein the pivot frame is pivotable between a first position where the pallet support plane is tilted a first angle with respect to the carriage base, and a second position where the pallet support plane is tilted a second angle with respect to the carriage base which is less than the first angle;
at least one biasing member extending between the pivot frame and the carriage base to urge the pivot frame towards the second position; and
at least one receiving member at the unload station which extends towards the carriage and positioned to receive thereon a plurality of pallets carried on the pallet support flanges.

9. The pallet conveyor of claim 8 wherein a floor extends rearward of the at least one track, the floor providing access for an operator to the pallet conveyor, and wherein the ledge rearward line of entry is spaced above the floor at least 16 inches.

10. The conveyor of claim 8 further comprising a shock absorber extending from the pivot frame to the carriage base.

11. The conveyor of claim 10 wherein the shock absorber comprises an air cylinder.

12. The conveyor of claim 10 wherein the biasing member comprises at least one extension spring.

13. The conveyor of claim 10 wherein the biasing member comprises at least one torsion spring.

14. The conveyor of claim 10 wherein a handle extends beneath the ledge, the handle being rotatable to disengage at least one latch which retains the pivot frame in the second position.

15. A pallet conveyor for transporting a plurality of pallets from a load station to an unload station, the conveyor comprising:
at least one track extending in a machine direction from a load station to an unload station;
a carriage having a base which is mounted to the at least one track for movement from the load station to the unload station in the machine direction;
a pivot frame mounted to the carriage base to rotate about a pivot axis which extends in a cross machine direction, the pivot frame having a rear wall defining a rear surface with an upper edge, wherein portions of the pivot frame define pallet support flanges which are spaced from one another in a cross-machine direction and which define a pallet support plane which is approximately perpendicular to the rear surface, wherein the pivot frame is pivotable between a first position where the rear surface is at an angle of 20-45 degrees with respect to the carriage base, and a second position where the pallet support flanges are approximately parallel to the carriage base and spaced above the at least one track;

at least one receiving member at the unload station having portions spaced above the at least one track and extending towards the carriage and positionable between the pallet support flanges to extend beneath a stack of pallets carried on the pallet support flanges when the carriage is brought into proximity with the at least one receiving member for transfer of the plurality of pallets to the at least one receiving member.

16. The conveyor of claim 15 further comprising a shock absorber extending from the pivot frame to the carriage base.

17. The conveyor of claim 16 wherein the shock absorber comprises an air cylinder.

18. The conveyor of claim 15 further comprising at least one biasing member extending between the pivot frame and the carriage base to urge the pivot frame towards the second position.

19. The conveyor of claim 18 wherein the biasing member comprises at least one extension spring.

20. The conveyor of claim 18 wherein the biasing member comprises at least one torsion spring.

* * * * *